US010949989B2

(12) United States Patent
Op Het Veld et al.

(10) Patent No.: US 10,949,989 B2
(45) Date of Patent: Mar. 16, 2021

(54) CONCEPT FOR DETERMINING A CONFIDENCE/UNCERTAINTY MEASURE FOR DISPARITY MEASUREMENT

(71) Applicant: Fraunhofer-Gesellschaft zur Foerderung der angewandten Forschung e.V., Munich (DE)

(72) Inventors: Ronald Op Het Veld, Nuremberg (DE); Joachim Keinert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 113 days.

(21) Appl. No.: 16/270,601

(22) Filed: Feb. 8, 2019

(65) Prior Publication Data
US 2019/0244380 A1   Aug. 8, 2019

(30) Foreign Application Priority Data
Feb. 8, 2018  (EP) ..................................... 18155897

(51) Int. Cl.
*G06T 7/00*     (2017.01)
*G06T 7/593*    (2017.01)
(Continued)

(52) U.S. Cl.
CPC ............ *G06T 7/593* (2017.01); *G06K 9/6202* (2013.01); *G06K 9/6215* (2013.01); *G06T 7/70* (2017.01);
(Continued)

(58) Field of Classification Search
CPC ......... G06K 2009/6213; G06K 9/6202; G06K 9/6215; G06T 2207/10012;
(Continued)

(56) References Cited

U.S. PATENT DOCUMENTS

2013/0259360 A1 * 10/2013 Bingrong .................. G06T 7/55
382/154

OTHER PUBLICATIONS

Saygili, Gorkem, Laurens van der Maaten, and Emile A. Hendriks. "Stereo similarity metric fusion using stereo confidence." 2014 22nd International Conference on Pattern Recognition. IEEE, 2014. (Year: 2014).*

(Continued)

*Primary Examiner* — Nirav G Patel
(74) *Attorney, Agent, or Firm* — Michael A. Glenn; Perkins Coie LLP

(57) ABSTRACT

A more effective confidence/uncertainty measure determination for disparity measurements is achieved by performing the determination on an evaluation of a set of disparity candidates for a predetermined position of a first picture at which the measurement of the disparity relative to the second picture is to be performed, and if this evaluation involves an accumulation of a contribution value for each of this set of disparity candidates, which contribution values depends on the respective disparity candidate and a dissimilarity to the second picture which is associated with the respective disparity candidate according to a function which has a first monotonicity with a dissimilarity associated with the respective disparity candidate, and a second monotonicity, opposite to the first monotonicity, with an absolute difference between the respective disparity candidate and a predetermined disparity having a minimum dissimilarity associated therewith among dissimilarities associated with the set of disparity candidates.

22 Claims, 8 Drawing Sheets

(51) Int. Cl.
    G06T 7/70       (2017.01)
    G06K 9/62       (2006.01)
(52) U.S. Cl.
    CPC ........ *G06T 7/97* (2017.01); *G06K 2009/6213* (2013.01); *G06T 2207/10012* (2013.01); *G06T 2207/20084* (2013.01); *G06T 2207/20228* (2013.01)
(58) Field of Classification Search
    CPC . G06T 2207/20084; G06T 2207/20228; G06T 7/593; G06T 7/70; G06T 7/97
    See application file for complete search history.

(56) References Cited

OTHER PUBLICATIONS

Brandao, Martim et al., "On Stereo Confidence Measures for Global Methods: Evaluation, New Model and Integration into Occupancy Grids", IEEE Transactions on Pattern Analysis and Machine Intelligence, vol. 38, No. 1, Jan. 2016, pp. 116-128.

Geiger, Andreas et al., "Are We Ready for Autonomous Driving? The KITTI Vision Benchmark Suite", Conference on Computer Vision and Pattern Recognition (CVPR), 2012, pp. 1-8.

Geiger, Andreas et al., "Vision Meets Robotics: The KITTI Dataset", The International Journal of Robotics Research, Vo. 32, No. 11, Aug. 2013, pp. 1231-1237.

Gong, Minglun et al., "Fast unambiguous stereo matching using reliability-based dynamic programming", IEEE Transactions on Pattern Analysis and Machine Intelligence, 27:6, 2005, pp. 998-1003.

Haeusler, Ralf et al., "Ensemble Learning for Confidence Measures in Stereo Vision", IEEE Conference on Computer Vision and Pattern Recognition (CVPR), 2013, pp. 305-312.

Hirschmuller, Heiko et al., "Real-Time Correlation-Based Stereo Vision with Reduced Border Errors", International Journal of Computer Vision 47, No. 1-3, 2002, pp. 229-246.

Hu, Xiaoyan et al., "A Quantitative Evaluation of Confidence Measures for Stereo Vision", IEEE Transactions on Pattern Analysis and Machine Intelligence, vol. 34, No. 11, 2012, pp. 2121-2133.

Matthies, Larry , "Stereo vision for planetary rovers: Stochastic modeling to near real-time implementation", International Journal of Computer Vision, 8:1, 1992, pp. 71-91.

Mei, Xing et al., "On Building an Accurate Stereo Matching System on Graphics Hardware", IEEE International Conference on Computer Vision Workshops, 2011, pp. 467-474.

Menze, Moritz et al., "Object Scene Flow for Autonomous Vehicles", Proceedings of the IEEE Conference on Computer Vision and Pattern Recognition, 2015, pp. 3061-3070.

Merrell, Paul et al., "Real-Time Visibility-Based Fusion of Depth Maps", IEEE 11th International Conference on Computer Vision, 2007, pp. 1-8.

Mordohai, Philippos , "The Self-Aware Matching Measure for Stereo", IEEE 12th International Conference on Computer Vision, 2009, pp. 1841-1848.

Park, Min-Gyu et al., "Leveraging Stereo Matching with Learning-Based Confidence Measures", Proceedings of the IEEE Conference on Computer Vision and Pattern Recognition, 2015, pp. 101-109.

Poggi, Matteo et al., "Learning a general-purpose confidence measure based on O(1) features and a smarter aggregation strategy for semi global matching", 3D Vision (3DV), Fourth International Conference on IEEE, Oct. 2016, pp. 509-518.

Poggi, Matteo et al., "Learning from scratch a confidence measure", Proceedings of the British Machine Vision Conference, 2016, pp. 46.1-46.13.

Poggi, Matteo et al., "Quantitative Evaluation of Confidence Measures in a Machine Learning World", 2017 IEEE International Conference on Computer Vision (ICCV), vol. 2012, 2017, pp. 5238-5247.

Scharstein, Daniel et al., "High-Accuracy Stereo Depth Maps Using Structured Light", IEEE Computer Society Conference on Computer Vision and Pattern Recognition, vol. 1, 2003, pp. 1-1.

Scharstein, Daniel et al., "High-Resolution Stereo Datasets with Subpixel-Accurate Ground Truth", German Conference on Pattern Recognition, Sep. 2014, pp. 31-42.

Scharstein, Daniel et al., "Learning Conditional Random Fields for Stereo", IEEE Conference on Computer Vision and Pattern Recognition (CVPR'07), 2007, pp. 1-8.

Scharstein, Daniel et al., "Stereo Matching with Nonlinear Diffusion", International Journal of Computer Vision, vol. 8, No. 2, Jun. 1998, pp. 155-174.

Seki, Akihito et al., "Patch Based Confidence Prediction for Dense Disparity Map", BMCV, 2016, pp. 1-13.

Spyropoulos, Aristotle et al., "Correctness Prediction, Accuracy Improvement and Generalization of Stereo Matching Using Supervised Learning", International Journal of Computer Vision, 118:3, 2016, pp. 300-318.

Spyropoulos, Aristotle et al., "Learning to Detect Ground Control Points for Improving the Accuracy of Stereo Matching", IEEE Conference on Computer Vision and Pattern Recognition (CVPR), 2014, pp. 1621-1628.

Yoon, Kuk-Jin et al., "Distinctive Similarity Measure for Stereo Matching Under Point Ambiguity", Computer Vision and Image Understanding, Vo. 112, No. 2, 2008, pp. 173-183.

Zbontar, Jure et al., "Computing the Stereo Matching Cost with a Convolutional Neural Network", Proceedings of the IEEE Computer Society Conference on Computer Vision and Pattern Recognition, vol. 07, No. 1, Jun. 2005, pp. 1592-1599.

Zhang, KE et al., "Cross-Based Local Stereo Matching Using Orthogonal Integral Images", IEEE Transactions on Circuits and Systems for Video Technology, 19:7 Jul. 2009, pp. 1073-1079.

Zhang, Zhengyou et al., "A Progressive Scheme for Stereo Matching", European Workshop on 3D Structure from Multiple Images of Large-Scale Environments, 2000, pp. 68-85.

\* cited by examiner

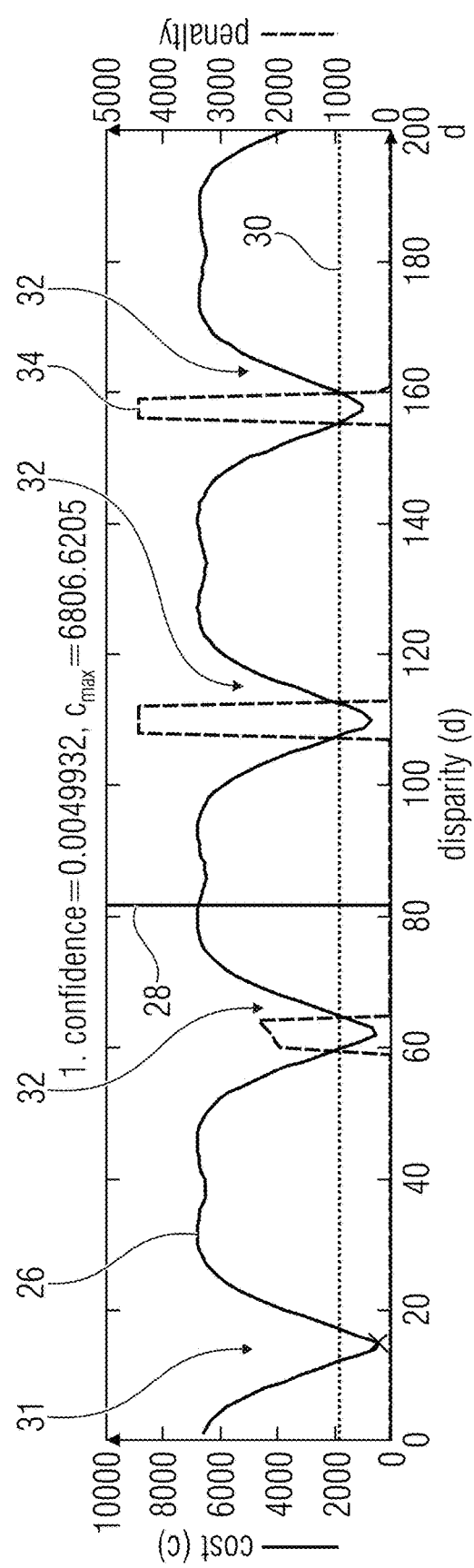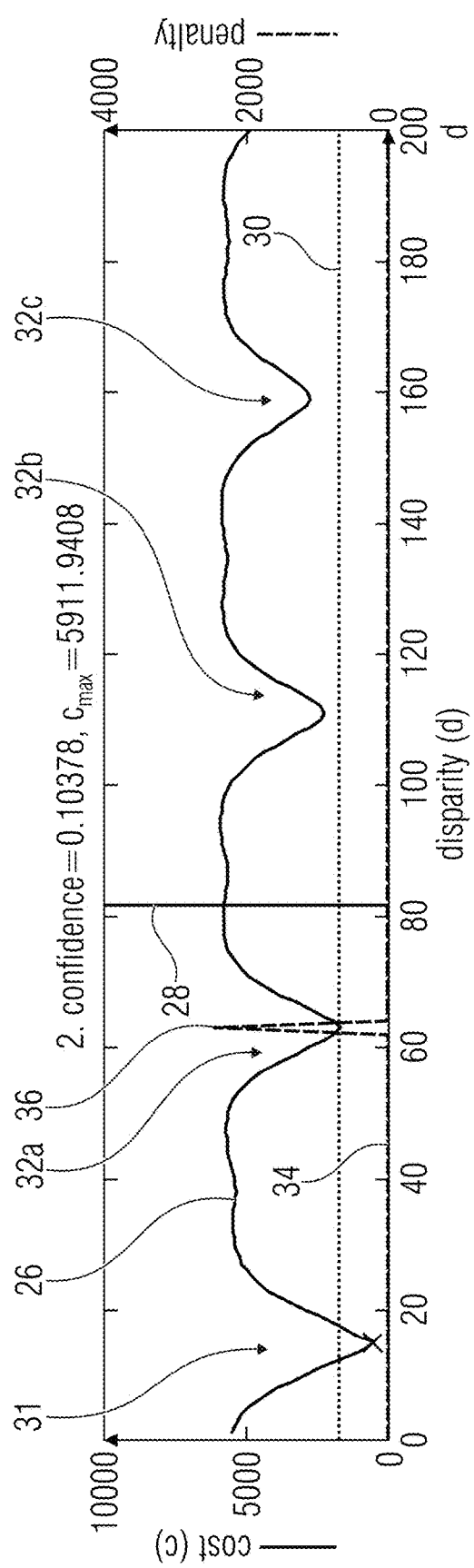
Fig. 2a
Fig. 2b

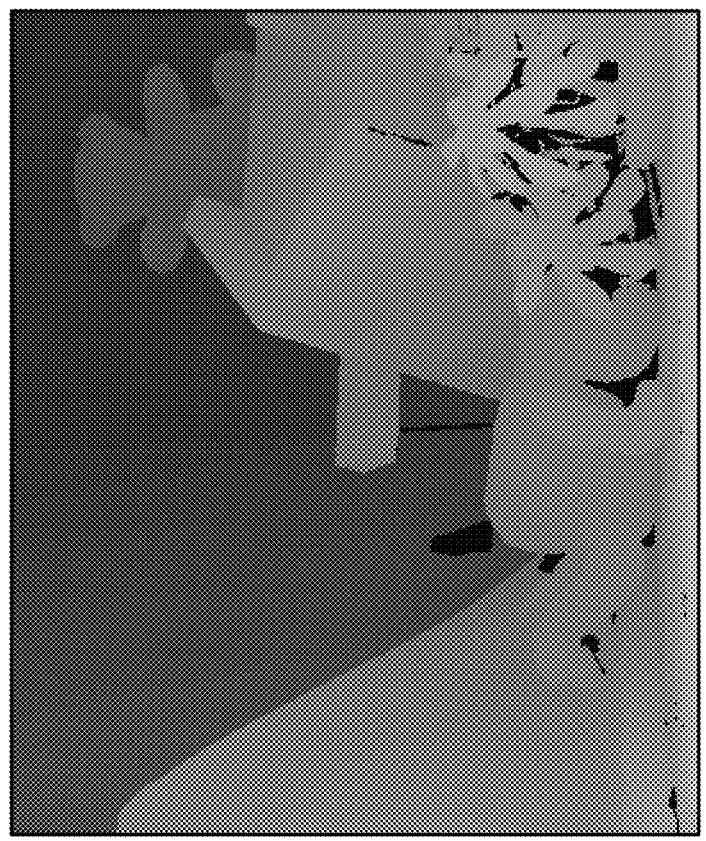
Fig. 3b estimated disparities
Fig. 3a input image $$\text{confidence} = \sum_d \overbrace{F(c(d), d)}^{72}$$

$$\text{confidence} = f_{\underset{\text{decreasing}}{\text{monotonically,}}}^{\;74} \left( \sum_d \overbrace{\text{factor 1 }(c(d)) \cdot \text{factor 2 }(d)}^{F} \right)$$

CONCEPT FOR DETERMINING A CONFIDENCE/UNCERTAINTY MEASURE FOR DISPARITY MEASUREMENT

CROSS-REFERENCE TO RELATED APPLICATIONS

This application claims priority from European Patent Application No. 18155897.4 which was filed on Feb. 8, 2018, and is incorporated herein in its entirety by reference.

The present application is concerned with a concept for determining a confidence measure or an uncertainty measure measuring a confidence in a correctness of, or a liability of incorrectness of, a measurement of a disparity of a predetermined position of a first picture relative to a second picture. Such confidence/correctness measures may be used in improved generation of disparity/depth maps and/or improved view synthesis based on disparity measurements.

BACKGROUND OF THE INVENTION

Stereo disparity estimation is one of the most researched and active fields within computer vision. This is mainly because existing algorithms do not obtain optimal results [1, 2, 3]. The estimated disparities are not accurate enough or the computational costs are too high. In recent years, deep-learning methods increased the accuracy of such algorithms [4, 5] and, for example, can be used to improve the quality of densely rendered light fields. In order to reconstruct these, fusion of multiple disparity maps may be used, which seems to be straightforward. However, due to false disparities, it is not. False disparities are being propagated and thus result in unreliable disparity maps. We propose a new confidence measure to filter out these initially false disparities.

When performing confidence measurement based on conventional approaches [6, 7, 8, 9, 10, 11, 12], confidences are assigned by examining the cost curves. The ideal cost curve as a function of disparity for a pixel has a single, distinct minimum. However, most cost curves are ambiguous because they have multiple local minima or multiple adjacent disparities with similar costs, making exact localization of the global minimum hard. The shape of the cost curve heavily depends on the stereo algorithm used. Some algorithms tend to be more sensitive to noise. Spyropoulos and Mordohai use the stereo method developed by Zbontar and Le Cun [4] to compute the matching costs. They trained a convolutional neural network (CNN) to predict whether two image patches match or not. In recent years, many confidence measures aiming at detecting unreliable disparity assignments, proved to be very effective cues when combined with state-of-the-art stereo algorithms [5, 14, 15, 16]. The ability to reliably detect failures of a stereo algorithm by means of a confidence measure is fundamental and many approaches have been proposed for this purpose. Hu and Mordohai [17] were the first ones to exhaustively review and compare confidence measures available at that time and defined an effective metric to evaluate the performance of the different measures. New confidence measures have been introduced and evaluated, mostly based on deep learning [5, 18] and other machine learning methods [14, 15, 16, 19, 13]. The latest thorough evaluation of 76 state-of-the-art confidence measures has been performed by Poggi et al. [20] in 2017. In this, a similar trend as in the evaluation of stereo algorithms can be seen, machine learning based approaches seem to outperform conventional approaches.

However, there is an ongoing need to further improve the quality of these confidence/uncertainty measures for disparity measurements.

SUMMARY

According to an embodiment, an apparatus for determining a confidence measure measuring a confidence in a correctness of, or an uncertainty measure measuring a liability of incorrectness of, a measurement of a disparity of a predetermined position of a first picture relative to a second picture, may be configured to accumulate, for each of a set of disparity candidates for the predetermined position, a contribution value which depends on the respective disparity candidate and a dissimilarity to the second picture which is associated with the respective disparity candidate according to a function which has a first monotonicity with the dissimilarity associated with the respective disparity candidate, and has a second monotonicity, opposite to the first monotonicity, with an absolute difference between the respective disparity candidate and a predetermined disparity having a minimum dissimilarity associated therewith among dissimilarities associated with the set of disparity candidates.

According to another embodiment, a system for generating a depth/disparity map for first picture relative to a second picture, may have: a determinator for determining a disparity of a predetermined position of the first picture relative to the second picture, and an inventive apparatus for determining a confidence measure measuring a confidence in the correctness of, or an uncertainty measure measuring a liability of incorrectness of, a measurement of the disparity of the predetermined position of the first picture relative to the second picture, wherein the determinator is configured to determine the predetermined disparity having a minimum dissimilarity associated therewith among the dissimilarities associated with the set of disparity candidates as the disparity.

According to another embodiment, a system for performing view synthesis based on a first picture, may have: an inventive system for generating a depth/disparity map for the first picture relative to a second picture, and a view synthesizer configured to perform the view synthesis using the depth/disparity map, wherein the view synthesizer is configured to perform the view synthesis based on the depth/disparity map and the confidence measure or the uncertainty measure, or wherein the view synthesizer is configured to perform the view synthesis based on the depth/disparity map and the confidence measure or the uncertainty measure by controlling an amount at which the view synthesis relies on the disparity measured or the related color value depending on the confidence measure or the uncertainty measure.

According to another embodiment, a method for determining a confidence measure measuring a confidence in a correctness of, or an uncertainty measure measuring a liability of incorrectness of, a measurement of a disparity of a predetermined position of a first picture relative to a second picture, may have the step of: accumulating, for each of a set of disparity candidates for the predetermined position, a contribution value which depends on the respective disparity candidate and a dissimilarity to the second picture which is associated with the respective disparity candidate according to a function which has a first monotonicity with the dissimilarity associated with the respective disparity candidate, and has a second monotonicity, opposite to the first monotonicity, with an absolute difference between the respective disparity candidate and a predetermined disparity having a minimum dissimilarity associated therewith among dissimilarities associated with the set of disparity candidates.

Another embodiment may have a non-transitory digital storage medium having a computer program stored thereon to perform the method for determining a confidence measure measuring a confidence in a correctness of, or an uncertainty measure measuring a liability of incorrectness of, a measurement of a disparity of a predetermined position of a first picture relative to a second picture, including accumulating, for each of a set of disparity candidates for the predetermined position, a contribution value which depends on the respective disparity candidate and a dissimilarity to the second picture which is associated with the respective disparity candidate according to a function which has a first monotonicity with the dissimilarity associated with the respective disparity candidate, and has a second monotonicity, opposite to the first monotonicity, with an absolute difference between the respective disparity candidate and a predetermined disparity having a minimum dissimilarity associated therewith among dissimilarities associated with the set of disparity candidates, when said computer program is run by a computer.

The present application is based on a finding according to which a more effective confidence/uncertainty measure determination for disparity measurements may be achieved if the determination is performed on an evaluation of a set of disparity candidates for a predetermined position of a first picture at which the measurement of the disparity relative to the second picture is to be performed, and if this evaluation involves an accumulation of a contribution value for each of this set of disparity candidates, which contribution values depends on the respective disparity candidate and a dissimilarity to the second picture which is associated with the respective disparity candidate according to a function which has a first monotonicity with a dissimilarity associated with the respective disparity candidate, and a second monotonicity, opposite to the first monotonicity, with an absolute difference between the respective disparity candidate and a predetermined disparity having a minimum dissimilarity associated therewith among dissimilarities associated with the set of disparity candidates. By this means, the confidence/uncertainty measure tends to decrease the confidence, and increase the uncertainty, with increasing number of local minima in the spatial distribution of disparity candidates. Further, the larger the disparity distance of any local minimum to the global minimum in terms of disparity is, the lower the confidence and the higher the uncertainty, respectively, tends to be. Further, the larger the distance of any local minimum to the global minimum in terms of dissimilarity is, the lower is its influence on the confidence/uncertainty measure determination.

BRIEF DESCRIPTION OF THE DRAWINGS

Embodiments of the present invention will be detailed subsequently referring to the appended drawings, in which:

FIG. 2a-d show example graphs of cost function representing the dissimilarities associated with the disparity candidates in order to illustrate different situations and the behavior of the confidence measure determined in accordance with a specific detailed embodiment of the present application;

FIG. 3a-d show in FIG. 3a the Teddy image from MB03, in FIG. 3b estimated disparities MC-CNN+box-filter, in FIG. 3c the confidences with a proposed confidence measure wherein brighter is higher and the presentation is non-linearly scaled for better visualization, and FIG. 3d shows error rates for Teddy at different densities; four curves for LRD, the detailed embodiment of the present application (AUC) according to Eq. (2), CCNN and optimal are shown; besides from the theoretically optimal curve, the confidence measure according to Eq. (2) turns out to have the lowest error rate for almost every density;

DETAILED DESCRIPTION OF THE INVENTION

Figure 1:
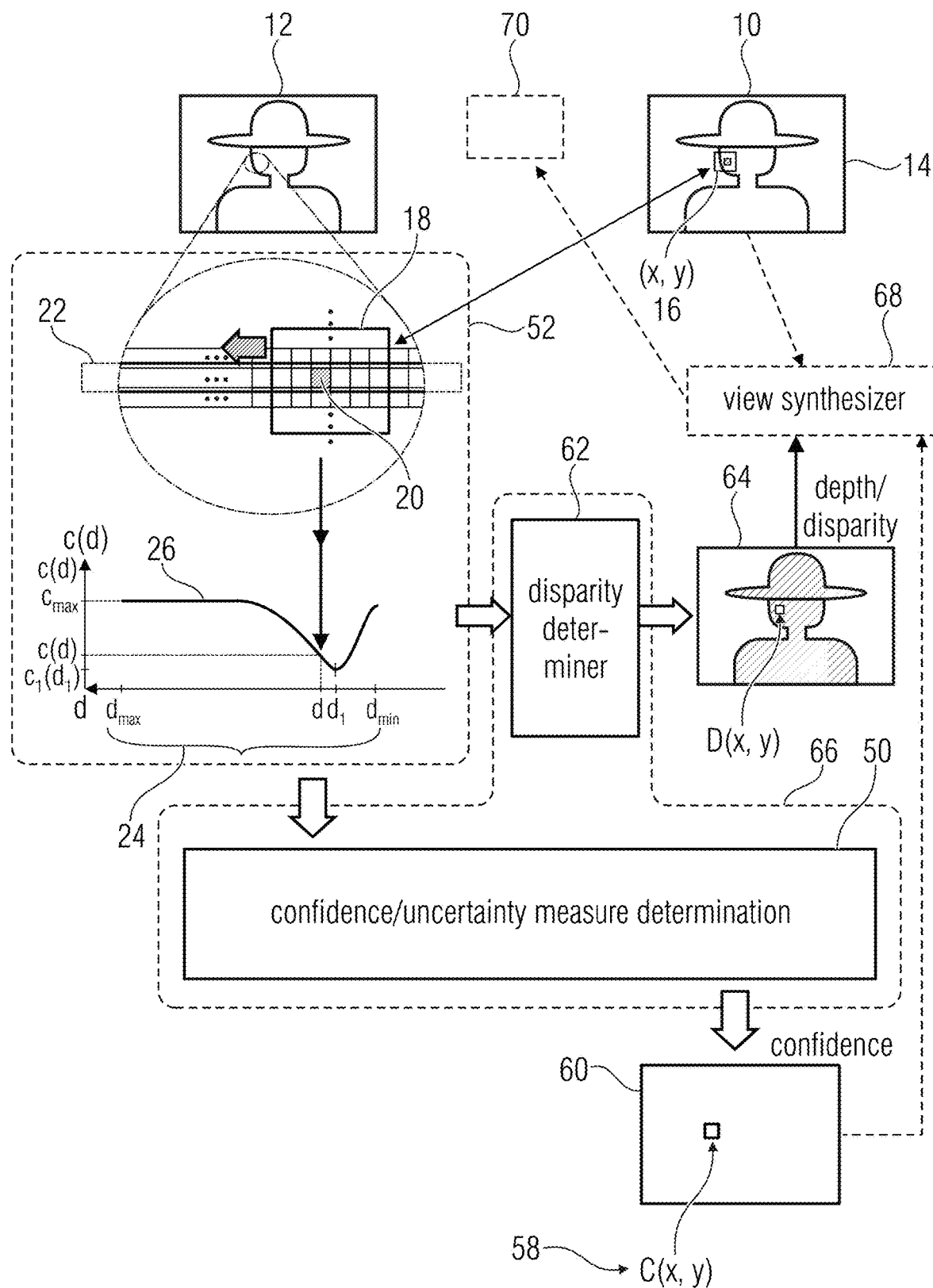
FIG. 1 shows a schematic diagram illustrating the set of disparity candidates for a predetermined position of a picture, the dissimilarities associated with these disparity candidates relative to a further picture, a confidence/uncertainty measure determinator in accordance with an embodiment of the present application, and further devices and apparatuses which may form, along with the confidence/uncertainty measure determinator systems for depth/disparity map generation or view synthesis.

The following description starts with a concrete example for the determination of a confidence measure and its advantages. Thereinafter, further embodiments are described, which represent broadened embodiments relative to this concrete example which cover the concrete example as one of possible alternatives and result from the concrete example by loosening some of the details thereof.

In presenting the concrete embodiment, we examine the correct embodiment and compare it to two state-of-the-art methods according to their ability to rank potential matches. To this end, the following description starts with a presentation of this state of the art confidence measure concepts whereupon the concrete example is introduced and explained. Thereinafter, an in-depth discussion about the experimental results is provided, followed by a conclusion thereof which is then followed, as indicated above, by a description of even further embodiments which broaden the concrete embodiment.

The two state of the art concepts used for comparison purposes are the left-right difference (LRD) [17] and confidence CNN (CCNN) [18]. Following [17], to better clarify which cues are processed by each single measure we use the following notation. Given a stereo pair of rectified left (L) and right (R) images, we compute the cost volume c(x; y; d) that contains a cost value for each possible match from a pixel in the left image $I_L(x_L; y)$ to a pixel in the right image $I_R(x_R; y)$, for every possible disparity. Disparity is defined conventionally as $d=x_L-x_R$. The minimum and maximum disparity values, $d_{min}$ and $d_{max}$, are provided by the dataset.

The cost curve of a pixel is the set of cost values for all allowable disparities for the pixel. $c_1$ and $c_2$ indicate the minimum and second minimum values of the cost curve, respectively, $c_2$ does not have to be a local minimum. The disparity value $d(c_1)$ is denoted by $d_1$.

We will now describe the two state-of-the-art methods in more details. The Left-Right Difference (LRD) confidence measure [17] favors a large margin between the two smallest minima of the cost for pixel $(x_L; y)$ in the left image and also consistency of the minimum costs between the left-to-right and right-to-left disparity maps:

$$C_{LRD}(x_L, y) = \frac{c_2(x_L, y) - c_1(x_L, y)}{|c_1(x_L, y) - \min_{c_R}(x_L - d, y)| + \varepsilon} \quad (1)$$

The intuition is that truly corresponding pixels should result in similar cost values and thus a small denominator. This formulation provides safeguards against two failure modes. If the margin $c_2-c_1$ is large, but the pixel has been mismatched the denominator will be large. If the margin is small, the match is likely to be ambiguous. In this case, a small denominator indicates that a correspondence between two similar pixels has been established. According to [17], LRD is one of the best overall methods for stereo inputs.

As a second confidence measure, we use confidence convolutional neural network (CCNN) [18]. In this approach, confidence prediction is regressed by a CNN without extracting any cue from the stereo input images. The deep network, trained on patches, learns from scratch a confidence measure by processing only the left disparity map, normalized with respect to the maximum disparity, to values between zero and one. For the evaluation we used the source code provided by the authors (using 8 bit confidence maps). This method has been identified by Poggi et al. [20] as the best performing one. However, training of such a network is an additional issue.

We evaluate these confidence measures using the stereo method matching cost convolutional neural network (MCCNN) developed by bontar and Le Cun [4]. An eight-layer network is trained on pairs of patches to compute a measure of similarity between them. These outputs represent matching scores for every possible disparity of each pixel. The scores are adaptively aggregated [21] and optimized using semi-global matching (SGM) to obtain the highly ranked results on the KITTI benchmark [22]. An accurate architecture and a faster/simplified (skipping cross-based aggregation) one were proposed. The latter showed a remarkable speed-up with respect to the accurate CNN architecture (0.8 sec vs 67 sec) with an increase of the error rate smaller than 1% on both KITTI datasets. We compute our cost volumes using the code provided by bontar and Le Cun [4], using their fast architecture pre-trained on the KITTI 2012 dataset [22], to avoid a biased evaluation but, naturally, others may be used alternatively.

The concrete example for confidence/uncertainty measure determination presented next aims at extracting useful information from the cost curve for each pixel in the disparity map. The confidence value for each pixel indicates if the assigned disparity is correct or not. Multiple local minima in the cost curve indicate uncertainty about the pixel's disparity value, therefore, the confidence should be low. Empirical tests also indicated the importance of the distance between multiple local minima. A large margin between the global minimum and all other costs is favored. This margin is empirically defined as $c_{max}/5$, where $c_{max}$ is the maximum cost within the defined disparity range. If there are multiple local minima more than 1 pixel apart, the confidence decreases. Based on this, we define our confidence measure as follows:

$$C(x, y) = \frac{1}{\sum_{d=d_{min}}^{d_{max}} \frac{\max\left(\min\left(\Delta d(x, y, d) - 1, \frac{d_{max} - d_{min}}{3}\right), 0\right)^2}{\max\left(\Delta c(x, y, d) - \frac{c_{max}(x, y)}{5}, 1\right)}} \quad (2)$$

with $\Delta d(x, y) = |d - d_1(x, y)|$ and $\Delta d(x, y, d) = c(x, y, d) - c_1(x, y) = c(d(x, y)) - c_1(x, y)$.

As the disparity d, forming the index of the summation, is used to compute the confidence measure for sample (x,y), we may alternatively write:

$$C(x, y) = \frac{1}{\sum_{d=d_{min}}^{d_{max}} \frac{\max\left(\min\left(\Delta d(x, y) - 1, \frac{d_{max} - d_{min}}{3}\right), 0\right)^2}{\max\left(\Delta c(x, y, d) - \frac{c_{max}(x, y)}{5}, 1\right)}}$$

with $\Delta d(x, y) = |d(x,y) - d_1(x, y)|$ and $\Delta d(x, y, d) = c(x, y, d) - c_1(x, y) = c(d(x, y)) - c_1(x, y)$.

In order to gain a better understanding of the nature of the confidence measure defined by the above equation, same is explained in more detail below.

The confidence measure (C(x, y)) is based on the shape of the cost curve (c(x, y, d)) over the evaluated disparity range to provide a better understanding, see FIG. 1. FIG. 1 shows a first picture 10 and a second picture 12 both of which show the same scene, but from different perspectives or viewpoints. Accordingly, depending on depth, scene objects appear in pictures 10 and 12 at varying relative spatial offset to one another, called disparity. If pictures 10 and 12 are rectified, disparities between corresponding scene objects in pictures 10 and 12 are limited to extend in one direction only, here the horizontal direction. In order to gain c(d) for a certain predetermined position 14 in picture 10 addressed, for instance, by x and y components (x, y), the following may be performed. For instance, a patch 16 of picture 10 which includes and surrounds position 14, is compared with a corresponding patch 18 of picture 12. The comparison involves, for instance, the determination of an SSD, i.e., sum of squared differences, or some other cost measure measuring the cost in so far as associating, in terms of disparity, patch 16 of picture 10 with patch 18 of picture 12 leads to some sort of deviation or dissimilarities which may be interpreted as a cost. Minimizing this cost increases the likelihood of having compared the same scene portions in pictures 10 and 12. Accordingly, patch 18 of picture 12 with which patch 16 of picture 10 at position 14 is compared, is positioned within picture 12 at several positions each corresponding to a disparity candidate, i.e. a disparity d at which the picture content corresponding to position 14 in picture 10 could possibly be displaced to the truly corresponding portion in picture 12. FIG. 1 shows one such test position 20 within picture 12 with patch 18 exemplarily positioned in a manner registered to this position 20, i.e. in a manner including and surrounding position 20. Patches 16 and 18 may, for instance, have positions 14 and 20, respectively, centered therein. The set of positions for which the comparison between patch 16 on the one hand and the respectively positioned patch 18 is performed, is illustrated at 22 in FIG. 1 and corresponds to a set of disparities spread between a minimum disparity $d_{min}$ and a maximum disparity $d_{max}$, i.e. spread within an interval 24 of disparities between $d_{min}$ and $d_{max}$. Thus, this procedure yields a cost or dissimilarity c(d) for each disparity d corresponding to a disparity candidate corresponding to any position within set 22. The result is a curve c(d) indicated at 24 in FIG. 1.

Naturally, any other cost measure than SSD may be used and it should also be mentioned that the "disparity" may be measured in units of sample positions or pixels at which two positions in Pictures 10 and 12, respectively, are displaced from one another, but that other measures may be used likewise and that these alternatives may be subsumed under the term dissimilarity for the purposes of the present application as well. One such alternative could be measuring a disparity between corresponding positions in pictures 10 and 12 in terms of depth as disparities translate via a unique reversible function into depths and vice versa.

Thus, as described so far, the disparity range 24 is ranging from $d_{min}$ to $d_{max}$ and the cost curve 26 represents the matching costs c(d) for each disparity d. The global minimum is defined as $c_1 = c(d_1)$ and the corresponding disparity as $d_1$. The maximum obtainable matching cost is defined as $c_{max}$.

A disparity $d_1$ should have a high confidence, if the corresponding cost $c_1$ is much smaller than other local minima. Local minima that are further away from the global minima $d_1$ have less negative influence on the confidence value. This is what Eq. (2) manages. Here, the values 3 and 5 were empirically established. They may be varied.

Based on the plots in FIGS. 2a-d, we will elaborate on this formula. In these plots, the disparities are shown on the x-axis, the left y-axis depicts the costs and the right y-axis the denominator $$p = \frac{\max\left(\min\left(\Delta d(x, y, d) - 1, \frac{d_{max} - d_{min}}{3}\right), 0\right)^2}{\max\left(\Delta c(x, y, d) - \frac{c_{max}(x, y)}{5}, 1\right)}$$

(alternatively written as $$p = \frac{\max\left(\min\left(\Delta d(x, y) - 1, \frac{d_{max} - d_{min}}{3}\right), 0\right)^2}{\max\left(\Delta c(x, y, d) - \frac{c_{max}(x, y)}{5}, 1\right)}),$$

which may be interpreted as penalty or uncertainty contribution, i.e. the higher its value the lower the confidence measure gets, owing to the summation over these uncertainty contributions for the various disparity candidates.

This is to illustrate how the confidence C(x, y) is influenced by multiple local minima. Please notice the different scaling of the axes in FIGS. 2a-d. The higher the penalty value, the lower the confidence will be.

For these plots, we exemplarily used $d_{min}=0$ and $d_{max}=200$, but both are merely chosen exemplarily.

The vertical line 28 indicates $$d1 + \frac{d_{max} - d_{min}}{3}$$

and the horizontal line 30 indicates $$c1 + \frac{c_{max}(x, y)}{5}.$$

FIG. 2a illustrates a cost curve 26 for a repetitive structure: multiple local minima 32 can be seen with similar costs. The further a local minimum 32 is away from the global minimum 31, $c_1$, the higher the penalty will be, as shown by the penalty curve p(d) 34. This penalty is limited by $$\frac{d_{max} - d_{min}}{3}.$$

Notice that the peaks of penalty curve 34 on the right of the line 28 are of equal height, i.e. clipped. The confidence is very low.

FIG. 2b illustrates a curve 26 also being a repetitive structure. However, the structure seems to change slightly, and therefore the costs differ. The second local minimum 32a (around d=62) is just within the boundaries of $$\frac{c_{max}(x, y)}{5}$$

(horizontal line 30) and has therefore a negative impact on the confidence. See the peak 36 of curve 34. The other two local minima 32b, c are considered not to be harmful and do not get a penalty. The confidence is low as well, however, slightly higher as in the case of FIG. 2a.

Figure 2C:
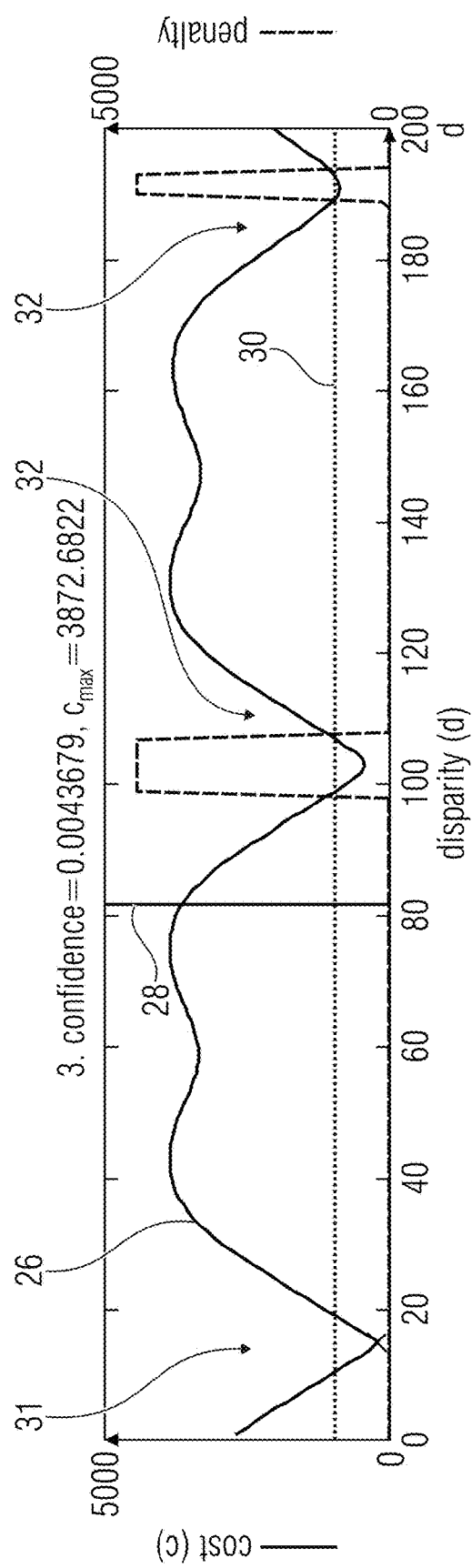

FIG. 2c is similar to FIG. 2a. The structure, of cost curve 26 here repeats with a lower frequency, i.e. there are merely two local minima 32.

Figure 2D:
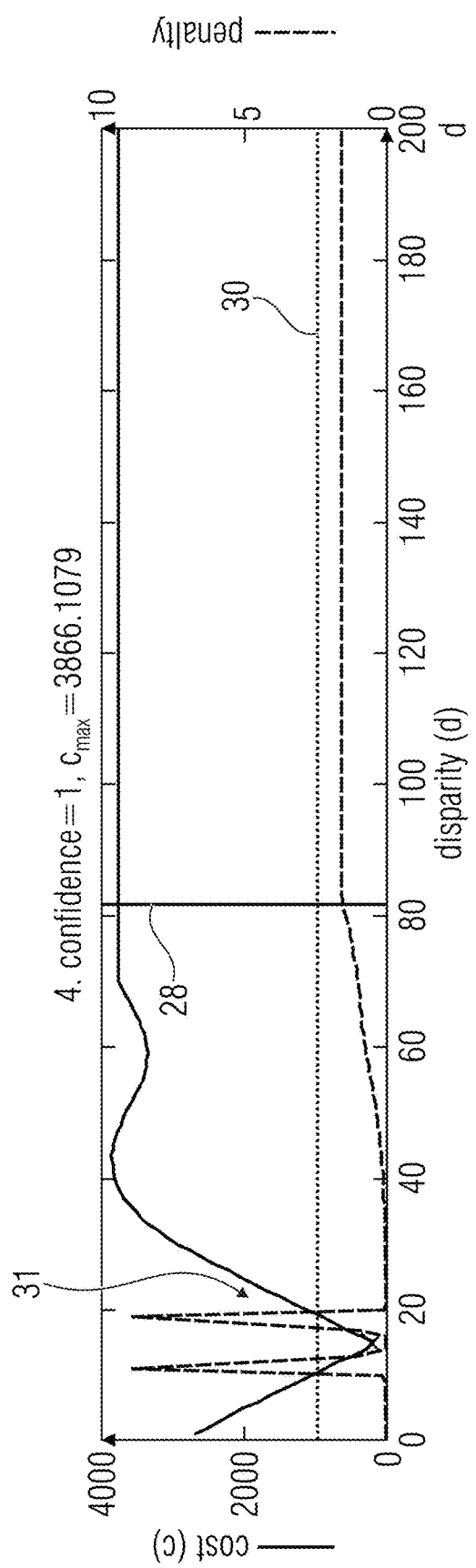

FIG. 2d is an example of an ideal case. There is only one minimum 31, therefore the confidence is high. Disparities close to the global minimum 31 are being slightly penalized. Notice here the y-axis, which is upscaled relative to FIGS. 2a-2c.

We subtract 1 from $\Delta d(x, y)$ (or alternatively written $\Delta d(x, y, d)$), to not penalize two minima next to each other, as this is most likely a quantization error and may be fixed in post-processing steps. To avoid negative penalties, the maximum with 0 is taken.

In the following, we briefly evaluate the two state-of-the-art methods LRD [17] and CCNN [18] and compare the performance to the confidence measure determination using Eq. (2), using MC-CNN [4] as basis. We maintain the same evaluation procedure as first described in [17]. For our evaluation, we used the following dataset.

TABLE 1

Details of Middlebury datasets used.

| | MB03Q | MB05T | MB06T | MB14Q |
|---|---|---|---|---|
| # pairs | 2 | 6 | 21 | 15 |
| Resolution | Quarter | Third | Third | Quarter |
| $d_{max}$ | 59px | 80px | 80px | As provided |

We use a combination of available Middlebury datasets for our experiments. The extended Middlebury stereo dataset consists of two stereo pairs from the 2003 dataset [23]

(MB03Q), six stereo pairs from the 2005 dataset [24, 25] (MB05T, the remaining three do not have ground-truth disparity maps available), all 21 image pairs from the 2006 dataset [24, 25] (MB06T), and all image pairs from the 2014 training dataset [3] (MB14Q), leading to a total of 44 stereo pairs. The images were captured indoors in a lab environment and depict objects with varying complexity. For each dataset, we evaluate on the smallest spatial resolution available and use maximum disparities as provided (see Table 1 for details). The minimum disparity is set to 0 pixels. As per the datasets specifications, the values of the calculated disparities are considered correct if the difference to the ground-truth is within 1 pixel. We evaluated the algorithms using the left images.

The ability to distinguish correct disparity assignments from wrong ones is the most desirable property of a confidence measure. To quantitatively evaluate this, the accuracy of disparity assignments based on confidences is evaluated using curves of error rate as a function of disparity map density (see FIG. 3 (d)), based on Gong and Yang [26]. The error rate is defined as the percentage of wrong pixels with respect to the density p. All disparities are sorted in decreasing order of confidence and disparity maps of increasing density are produced by selecting disparities according to rank. This measures the capability of removing errors from a disparity map according to the confidence values. The area under the curve (AUC) quantifies the capability of the confidence measure to effectively distinguish good matches from wrong ones. Better confidence measures result in lower AUC values.

Given a disparity map, a subset P of pixels is extracted in order of decreasing confidence (e.g., 5% of the total pixels) and the error rate of this subset is computed as the percentage of pixels, with respect to the density p, with an absolute distance from ground-truth values (including occluded pixels) higher than a threshold. Then, the subset is increased by extracting more pixels (e.g., an additional 5%) and the error rate is computed, until all the pixels in the image are considered. When confidences have identical values, all disparities with equal confidences are included into the subsample. This increases the density, therefore the x-axis in FIG. 3 (d) is labeled with minimum density.

The theoretically optimal AUC can be achieved by selecting all correct disparities before starting to fill the quasi-dense disparity maps with the remaining wrong ones and is defined as in [17]:

$$A_{opt} = \int_{1-\varepsilon}^{1} \frac{p - (1-\varepsilon)}{p} dp = \varepsilon + (1-\varepsilon)\ln(1-\varepsilon), \quad (3)$$

where p is the density and ε is the disparity error rate at full density as introduced in [17].

Following this protocol, we evaluate the three confidence measures on the extended Middlebury dataset, using the stereo algorithm MC-CNN [4] as input. This method adopts a winner takes all (WTA) strategy and infers costs using a local method, comparing image patches using a convolutional neural network. We used the fast architecture network, trained by the authors on the KITTI 2012 dataset. We also adopt our own post-processing method, consisting of a 9×9 box-filter operating on the cost volume, which improves the results even further.

Figure 3D:
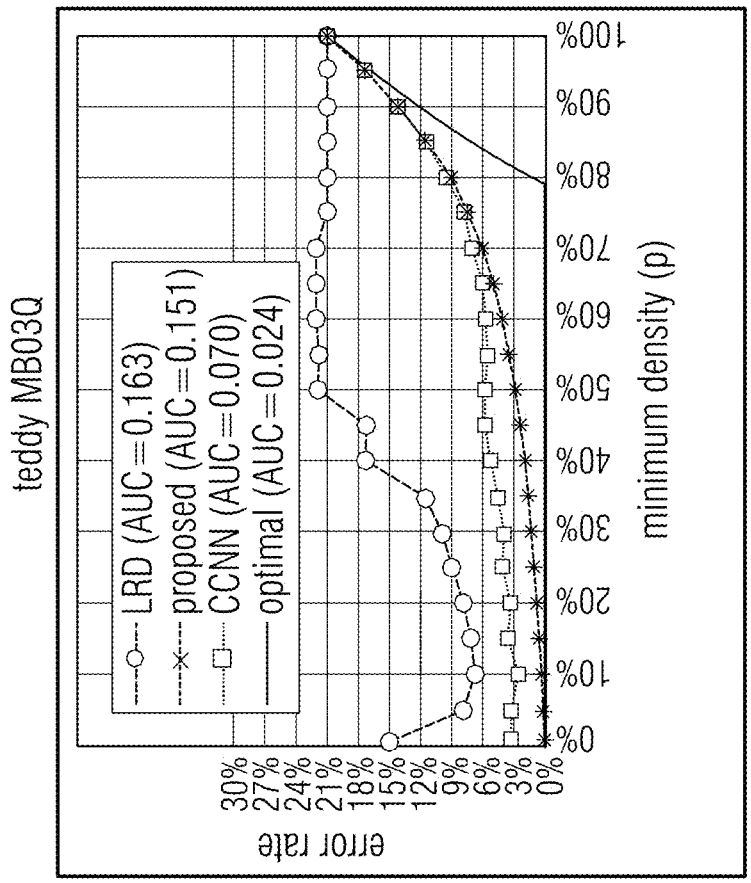
Figure 3C:

In FIG. 3, (a) one of the input images (Teddy, MB03Q), with (b) estimated disparities, and (c) confidences determined using Eq. (2) are shown. In FIG. 3 (d), the disparity density (p) vs the error rate for the Teddy image pair from the Middlebury 2003 dataset are shown.

Figure 4:
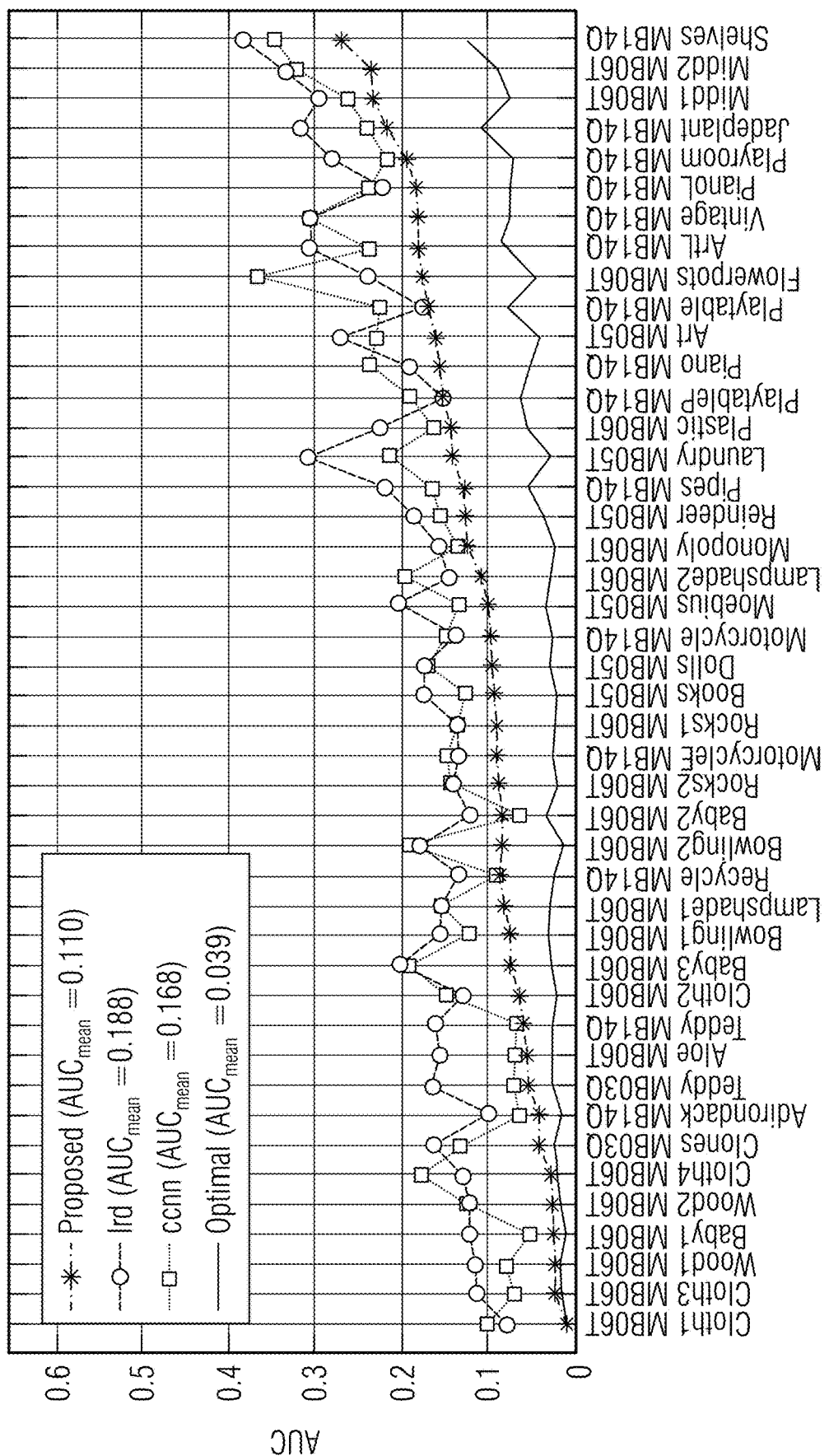
FIG. 4 shows AUC values for the three confidence measures, evaluated on the extended Middlebury dataset. Lower values are better. Sorted by AUC with respect to the confidence measure according to Eq. (2). The Eq. (2) based confidence measure outperforms the state-of-the-art methods on all, but one, stereo pairs.

By combining these results for all image pairs into one graph, we end up with FIG. 4. For each stereo pair in the extended Middlebury dataset, the obtained AUC is depicted. The lower the value, the better the confidence measure. All results are sorted by AUC values with respect to our proposed method.

Observing these figures, we can see that our proposed method clearly outperforms LRD and CCNN for most image pairs in our dataset. Confidences determined using Eq. (2) improve 34.5% on the CCNN measure, indicating that a non-learning based approach can perform better than a machine learning-based one.

For completeness, we also integrated our confidence measure into the ADCensus [27] stereo algorithm. The cost function is a combination of Sum of Absolute Difference (SAD) and Census. Evaluating the extended Middlebury dataset, we obtained the average AUC values as shown in Table 2. Our proposed confidence measure obtains similar results to the CCNN confidence measure. We believe we cannot outperform the state-of-the-art using this stereo algorithm as input, due to the noise present in the cost-curve.

In Table 2, average AUC values evaluating different confidence measures on the extended Middlebury dataset, using ADCensus to compute the cost function, compared to using the MC-CNN with box-filter as input.

TABLE 2

|  | LRD | CCNN | Proposed | Optimal |
| --- | --- | --- | --- | --- |
| MC-CNN $AUC_{mean}$ | 0.188 | 0.168 | 0.110 | 0.039 |
| ADCensus $AUC_{mean}$ | 0.266 | 0.223 | 0.228 | 0.090 |

Briefly concluding the above concrete example, a novel confidence measure has been presented and we reviewed and evaluated two state-of-the-art confidence measures and compared them to this measure. Our evaluation, using the MC-CNN stereo algorithm and the extended challenging Middlebury dataset, clearly highlights that the confidence measure determined using Eq. (2) outperforms the currently best performing confidence measure CCNN by 34.5%. The confidence computation does not need any machine learning and can be applied directly to most stereo algorithms (provided a cost volume is available). This evaluation shows that learning-based methods can be outperformed by conventional approaches and that our proposed confidence measure would be an useful addition to machine learning-based confidence measures.

The confidence measure presented herein may be integrated into different applications, e.g., disparity post-processing algorithms [13], multi-view-stereo, and data fusion. The improvement of initial disparity maps, could lead to improved depth-image-based-rendering results.

After having described a concrete embodiment for the computation of a confidence measure using the Eq. (2), reference is made to FIG. 1 again on the basis of which the set of disparity candidates corresponding to various tested disparities and the associated costs or dissimilarities has been described which together form cost curve 26. What has been described above is, broadly speaking, a determinator for determining a confidence/uncertainty measure, indicated by reference sign 50 in FIG. 1. This apparatus 50 determines a confidence measure measuring a confidence in a correctness of a measurement of a disparity of the predetermined position 16 of the first Picture 10 relative to the second Picture 12. The confidence measure has been denoted C in the above description and x, y has been used in order to identify the predetermined position 16. The same terminology has been used in FIG. 1. It should be clear, however, that apparatus 50 may, alternatively, determine an uncertainty measure measuring a liability of an incorrectness of the measurement of the disparity of the predetermined position 16 instead. For instance, instead of computing C(x, y) using Eq. (2), apparatus 50 could compute the inverse thereof, i.e. leave-off the inversion in Eq. (2) and simply take the denominator, i.e. the sum in the denominator, of Eq. (2) as the uncertainty measure. This possibility of determining the uncertainty measure instead of the confidence measure shall apply to all the embodiments outlined above and further outlined below without mentioning this possibility every time again.

Figures 5A, 5B, 5C:
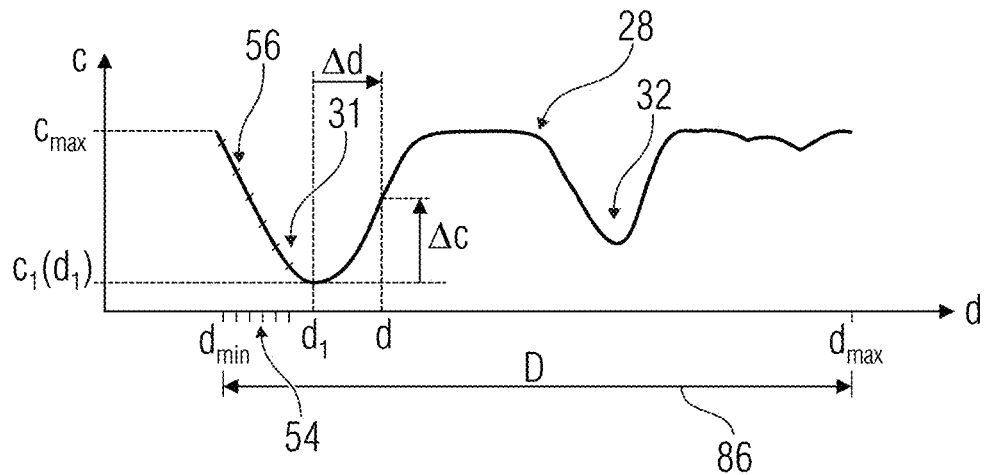
FIG. 5a shows a schematic diagram of a cost curve, i.e. a distribution of dissimilarities over disparity candidates.
FIG. 5b shows for illustration purposes the confidence/uncertainty measure determination in form of an accumulation over contribution values for each of the set of disparity candidates.
FIG. 5c illustrates schematically the possibility of determining the contribution values by means of a product between two factors.

To this, apparatus 50 receives for each of the set of disparity candidates for the predetermined position 16, the disparity of the respective disparity candidate d as well as the dissimilarity associated therewith, i.e. c(d), i.e. the dissimilarity between Picture 10 and Picture 12 when comparing Picture 10 at position 16 with Picture 12 at a position relating to position 16 via disparity d. While the computation or determination of the dissimilarities c(d) may be a task performed externally to determinator 50 by some dissimilarity determinator 52 as depicted in FIG. 1, the dissimilarity determinator 52 may alternatively be a component within determinator 50 itself. To be more precise, dissimilarity determinator 52 determines for each of the set of disparity candidates, the dissimilarity associated therewith, i.e. the cost curve for which the reference sign 26 has been used in the above figures. FIG. 5a shows an example of such a cost curve again. It associates with each of disparity candidates 54 a dissimilarity 56. The confidence/uncertainty measure determinator 50 determines the confidence/uncertainty measure 58 on the basis of this cost curve 26 and, thereby, obtains the confidence/uncertainty measure 58 for position 16. The task may be performed for all positions 16 such as pixels or samples of Picture 10, in order to obtain a corresponding confidence/uncertainty measure 58 for each pixel/sample, thereby obtaining a confidence map 60.

FIG. 1 illustrates that, besides confidence/uncertainty measure determinator 50, a disparity determinator 62 may use the cost function 26 generated by dissimilarity determinator 52 in order to determine or measure a disparity value D for position 16. Disparity determinator 62 may perform this task for all positions 16 of Picture 10, thereby generating a depth/disparity map 64 for Picture 10 which associates each position of Picture 10, i.e. such as each pixel or sample of Picture 10, a corresponding disparity, i.e. a disparity or depth value. For instance, disparity determinator 62 may set the disparity D(x, y) to be equal to $d_1$, i.e. the minimum disparity of cost curve 26 obtained for position x, y. Disparity determinator 62 and confidence/uncertainty measure determinator 50 could form, together, as indicated by dashed line 66, a system for generating a depth/disparity map 64 for Picture 10 relative to Picture 12. This system 66 could output the depth/disparity map 64 accompanied by confidence/uncertainty map 60 so that each disparity in map 64 would have associated therewith a confidence/uncertainty measure 58. Additionally or alternatively to the accompanying of the depth/disparity map 64 with the confidence/uncertainty map 60, disparity determinator 62 could be configured to take the confidence/uncertainty measures 58 into account in determining the disparities of map 64. For instance, disparity determinator 62 may preliminarily use $d_1$, i.e. the disparity leading to minimum dissimilarity within the set of disparity candidates, to D(x, y) in order to order a preliminary version of the depth/disparity map with then disregarding disparities D(x, y) and substituting same for positions (x, y) at which the confidence/uncertainty measure 58, C(x, y) is too low in case of being a confidence measure, or too high in case of being an uncertainty measure. The check may be based on a predetermined threshold. If substitution is performed for some preliminary disparity, the substitute disparity may be determined by disparity determinator 62 from some other source. For instance, disparity determinator 62 may spatially predict the disparity D(x, y) from neighboring positions neighboring position x, y for which a confidence/uncertainty measure 58 indicated a sufficiently confident situation. Alternatively, disparity determinator 62 may derive a substitute disparity for a certain position on the basis of a disparity value taken from a corresponding position of another depth/disparity map concerning the same scene such as a depth-disparity map determined for Picture 12 in the same manner as done for Picture 10.

As also shown in FIG. 1 for illustration purposes, a view synthesizer 68 may use the depth/disparity map 64, accompanied with or not accompanied with the confidence map 60, in order to perform a view synthesis in order to obtain a Picture 70 showing the same scene as pictures 10 does, but from another perspective or viewpoint different from the one of picture 10 and positioned, for instance, between the viewpoints or perspectives of picture 10 and picture 12 which formed the basis of depth map generation of map 64. View synthesizer 68 may, thus, form along with system 66 a system for performing view synthesis based on picture 10 using the confidence/uncertainty map 60 by shifting the texture/color sample values of picture 10 according to disparities indicated by map 64. The view synthesizer 68 may use the confidence/uncertainty map 60, if present, in order to base the view synthesis on those samples or disparities within depth/disparity map 64 for which the corresponding confidence is higher according to the collocated confidence/uncertainty measure 58 and map 60. To this end, the amount at which the inter-view synthesis by synthesizer 68 relies on the depth/disparity map 64 in order to synthesize Picture 70 from Picture 10 is controlled for each position x, y depending on the corresponding confidence/uncertainty measure 58, C(x, y). If the confidence map 60 is not present it may already have been used by disparity determiner 62 so as to generate a more reliable depth map 64.

The confidence/uncertainty measure determinator 50, however, is not restricted to perform the determination of the confidence/uncertainty measure 58 using Eq. (2) thoroughly described above. Eq. (2) may be varied in many aspects with still yielding the characteristics according to which the confidence is the lower, or the uncertainty the higher, 1) the more local minima 32 are present in the cost curve 26, i.e. the distribution of dissimilarities,
2) the closer one or more of the one or more local minima 32 gets to the global minimum 31 in terms of dissimilarity distance Δc,
3) the larger the disparity distance Δd of the local minima 32 is to the global minimum 31,
4) wherein local minima 32 lying pretty close to the global minimum 31 in terms of disparity distance Δd do substantially not reduce the confidence or increase the uncertainty and
5) wherein there may be a predetermined minimum dissimilarity distance as defined by 30 in FIG. 2, so that local minima 32 coming closer to the global minimum 31 in terms of dissimilarity distance Δc lead to confidence reduction or uncertainty increase whereas for local minima 32 which stay farther away from the global minimum 31 in terms of dissimilarity distance Δc do not lead to confidence decrease or uncertainty increase.

Instead of using the exact formula of Eq. (2), the determinator 50 may determine the confidence/uncertainty measure in a manner broadly indicated in FIG. 5b. To this, apparatus 50 may accumulate, for each of the set 54 of disparity candidates for the predetermined position 16, a contribution value 72 which depends on the respective disparity candidate d and its dissimilarity c(d) to the second Picture 12. A contribution value 72 depends on pair c(d) and d as indicated in FIG. 5b via a function F which has a first monotonicity with a dissimilarity c(d) and has a second monotonicity, opposite to the first monotonicity, with an absolute difference between the respective disparity candidate d and the disparity $d_1$ of the minimum dissimilarity $c(d_1)$. The first monotonicity may be a monotonic increase with a second monotonicity being a monotonic decrease or vice versa the first monotonicity may be a monotonic decrease with a second monotonicity being a monotonic increase.

The function F forming the contribution value 72 may, as outlined above by way of Eq. (2), be formed by a product between two factors as shown in FIG. 5c. The first factor is a function of dissimilarity c(d) and has the first monotonicity with c(d) and the second factor is a function of the dissimilarity d and has the second monotonicity with the absolute difference between the disparity candidate d and the minimum disparity $d_1$, i.e. $|d-d_1|$. The accumulation over the set of disparity candidates may be done by way of a sum as illustrated in FIGS. 5b and 5c as well as in Eq. (2), but an alternative may be used as well. As illustrated in FIG. 5c and already discussed above with respect to the inversion of Eq. (2), the result of this summation, i.e. the sum or accumulation result, may be subject to a monotonically decreasing function 74 such as an inversion depending on whether a confidence measure or an uncertainty measure is sought to be computed by determinator 50. The monotonically decreasing function 74 may be an inversion, i.e. may map value x onto 1/x as illustrated in Eq. (2), but another monotonically decreasing function may alternatively be used.

Figure 5D:
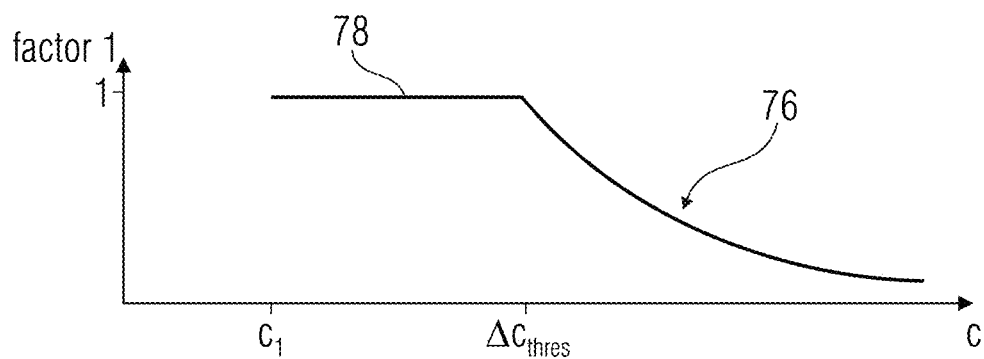
FIGS. 5d-e show schematically possibilities for designing the two factors of FIG. 5c.

As got also clear by the description of Eq. (2), the first factor of FIG. 5c may be designed as illustrated in FIG. 5d. Here, the first factor depends on the dissimilarity c(d) according to a monotonic function 76 which comprises a plateau 78 for dissimilarity values indicative of lower dissimilarity than a predetermined threshold $\Delta c_{thres}$. As described above, the apparatus 50 may be configured to determine this threshold $\Delta c_{thres}$ depending on the maximum dissimilarity $c_{max}$ among the dissimilarities c(d) for the set 54 of disparity candidates d. To be more precise, the threshold $\Delta c_{thres}$ may be determined based on the minimum dissimilarity $c_1$ and the maximum dissimilarity $c_{max}$. For instance, in the above example of Eq. (2), the predetermined threshold $\Delta c_{thres}$ has been determined as $c_1$ plus a fraction of $c_{max}$ wherein the fraction has be chosen as ⅓, but this fraction may alternatively be chosen to be between ½ and 1/20, both inclusively. Even alternatively, the fraction may be chosen to be ⅓±1%. As illustrated in FIG. 5d, function 76 may be strictly monotonic for dissimilarities indicative of higher dissimilarities than threshold $\Delta c_{thres}$, i.e. to the right of $\Delta c_{thres}$ in FIG. 5d. Here, function 76 may be 1/(c(d)− const) with const being a constant. Again, in Eq. (2), $\Delta c_{thres}$ has been $c_1+t \cdot c_{max}$ wherein t may be a fraction for which alternatives have been just-mentioned. But it should be recalled that dissimilarity may be measured in terms of another measure, inversely related to cost/dissimilarity. Then, function 26 would look different, i.e. minima would in fact become maxima, and then the threshold could be determined in a different manner, namely based on a predetermined fraction of the minimum dissimilarity $d_1$ or a difference of the minimum dissimilarity $d_1$ and a predetermined fraction of a difference between the minimum dissimilarity $d_1$ and the maximum dissimilarity $d_{max}$ with the predetermined fraction being, again, smaller than one. Function 76 may be continuous at the threshold as depicted in FIG. 5d.

Figure 5E:
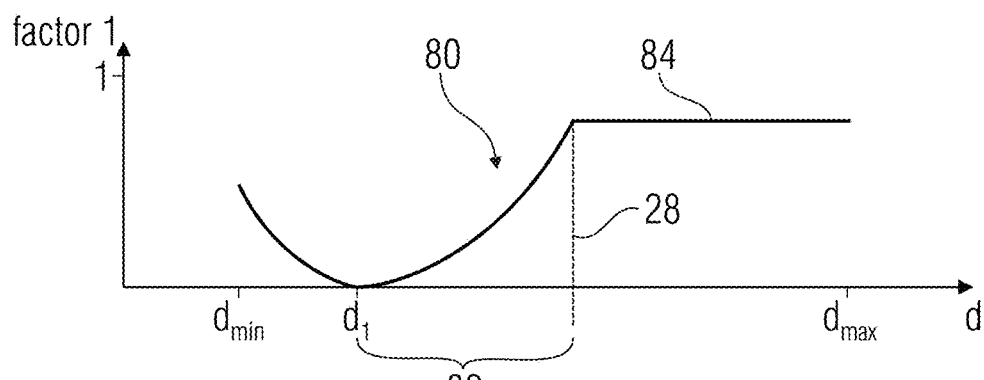

FIG. 5e illustrates the second factor and that same may depend on disparity d via a function 80 according to which, for instance, the absolute difference is subject to a power greater than 1 for absolute differences smaller than a predetermined threshold 82 which defines the vertical line 28 already mentioned above with respect to FIGS. 2a to 2d. For absolute differences greater than this threshold 82, function 80 may have a plateau 84. Event his function 80 may be continuous at the transition from plateau 84 towards $d_1$. Apparatus 50 may determine threshold 82, or threshold 82 may otherwise have been determined, depending on the range 86 (FIG. 5a) of disparity candidates 54. Threshold 82 may be determined as a fraction of this range and this fraction is not restricted to ⅓ as it has been the case in Eq. (2), but may, for instance, be between ⅓±10%, both inclusively. The power may be 2 as also illustrated in Eq. (2).

With respect to function 72, it should be mentioned that same could be implemented in different manners. The input value of this function F could be subject to weights, powers and clipping factors in a manner so as to advantageously adjust the above-outlined characteristics 1 to 5 of this function F. This adjustment leads to a high sensitivity in determining the correct confidence/uncertainty by enabling to take into account merely those local minima which really have an impact on the confidence/uncertainty.

Thus, above description revealed an apparatus for determining a confidence measure 58 measuring a confidence in a correctness of, or an uncertainty measure measuring a liability of incorrectness of, a measurement of a disparity of a predetermined position 16 of a first picture 10 relative to a second picture 12, configured to accumulate, for each of a set 54 of disparity candidates for the predetermined position 16, a contribution value 72 which depends on the respective disparity candidate and a dissimilarity to the second picture 12 which is associated with the respective disparity candidate according to a function F which has a first monotonicity with the dissimilarity c associated with the respective disparity candidate, and has a second monotonicity, opposite to the first monotonicity, with an absolute difference between the respective disparity candidate d and a predetermined disparity $d_1$ having a minimum dissimilarity $c_1$ associated therewith among dissimilarities associated with the set 54 of disparity candidates. The apparatus may be configured to compute the contribution value 74 as a product comprising a first factor and a second factor, the first factor has the first monotonicity with the dissimilarity c associated with the respective disparity candidate, and the second factor has the second monotonicity with the absolute difference between the respective disparity candidate d and the predetermined disparity $d_1$. The first monotonicity may be a monotonic increase and the second monotonicity is a monotonic decrease and the apparatus is configured to subject a result of the accumulation to a monotonically decreasing function 74 to obtain the confidence measure, or use the result of the accumulation as the uncertainty measure, or the first monotonicity may be a monotonic decrease and the second monotonicity is a monotonic increase and the apparatus is configured to subject a result of the accumulation to a monotonically decreasing function 74 to obtain the uncertainty measure, or use the result of the accumulation as the confidence measure. The monotonically decreasing function may map x onto 1/x. The first factor may depend on the dissimilarity associated with the respective disparity candidate according to a first monotonic function comprising a plateau for dissimilarity values corresponding to lower dissimilarities than a first predetermined threshold. The apparatus may be configured to determine the first predetermined threshold depending on a maximum dissimilarity $c_{max}$ among the dissimilarities associated with the set of disparity candidates. The apparatus may be configured to determine the first predetermined threshold based on the minimum dissimilarity $c_1$ and the maximum dissimilarity $c_{max}$. The apparatus may be configured to determine the predetermined threshold based on a sum of the minimum dissimilarity $c_1$ and a predetermined fraction of the maximum dissimilarity $c_{max}$, the predetermined fraction being smaller than one. The apparatus may be configured to determine the predetermined threshold based on a predetermined fraction of the minimum dissimilarity or a difference of the minimum dissimilarity and a predetermined fraction of a difference between the minimum dissimilarity and the maximum dissimilarity with the predetermined fraction being smaller than one. The predetermined fraction may lie between ½ and ½0, both inclusively. The predetermined fraction May be ⅓±1%. The first monotonic function may be strictly monotonic corresponding to dissimilarities larger than the first predetermined threshold. The first monotonic function may be 1/(c(d)−const) above the first predetermined threshold with c(d) being the dissimilarity associated with the disparity candidate d and const being a constant. The constant is specific for the position 16 via $c_1$, for instance. The second factor may depend on the absolute difference according to a predetermined function according to which the absolute difference is subject to a power greater than 1 below a second predetermined threshold and has a plateau above the second predetermined threshold. The second predetermined threshold may depend on a range of the set of disparity candidates. The second predetermined threshold may a fraction of a range of the set of disparity candidates, the fraction being between ⅓±10%, both inclusively. The power may be 2. The apparatus may be configured so that the confidence measure C(x,y) is $$C(x, y) = \frac{1}{\sum_{d=d_{min}}^{d_{max}} \frac{\max\left(\min(\Delta d(x, y, d) - 1, \frac{D}{3}), 0\right)^2}{\max\left(\Delta c(x, y, d) - \frac{c_{max}(x, y)}{5}, 1\right)}}.$$

The apparatus may be configured to obtain for each of set of disparity candidates for the predetermined position, a dissimilarity measure indicating the dissimilarity to the second picture which is associated with the respective disparity candidate, or a similarity measure indicating an inverse of which indicating the dissimilarity to the second picture which is associated with the respective disparity candidate. The apparatus may perform the confidence/uncertainty measure determination for each position or sample of picture 10. The dissimilarity measure may be a sum of squared sample differences, or the similarity measure is a correlation value.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] Andreas Geiger, Philip Lenz, Christoph Stiller, and Raquel Urtasun, "Vision meets robotics: The kitti dataset," The International Journal of Robotics Research, vol. 32, no. 11, pp. 1231-1237, 2013.

[2] Moritz Menze and Andreas Geiger, "Object scene flow for autonomous vehicles," in Proceedings of the IEEE Conference on Computer Vision and Pattern Recognition, 2015, pp. 3061-3070.

[3] Daniel Scharstein, Heiko Hirschmüller, York Kitajima, Greg Krathwohl, Nera Nesic', Xi Wang, and Porter Westling, "High-resolution stereo datasets with subpixel-accurate ground truth," in German Conference on Pattern Recognition. Springer, 2014, pp. 31-42.

[4] Jure Zbontar and Yann Le Cun, "Computing the stereo matching cost with a convolutional neural network," Proceedings of the IEEE Computer Society Conference on Computer Vision and Pattern Recognition, vol. 07-12-June, no. 1, pp. 1592-1599, 2015.

[5] Akihito Seki and Marc Pollefeys, "Patch based confidence prediction for dense disparity map," in BMVC, 2016.

[6] Philippos Mordohai, "The self-aware matching measure for stereo," in Computer Vision, 2009 IEEE 12th International Conference on. IEEE, 2009, pp. 1841-1848.

[7] Larry Matthies, "Stereo vision for planetary rovers: Stochastic modeling to near real-time implementation," International Journal of Computer Vision, vol. 8, no. 1, pp. 71-91, 1992.

[8] Daniel Scharstein and Richard Szeliski, "Stereo matching with nonlinear diffusion," International journal of computer vision, vol. 28, no. 2, pp. 155-174, 1998.

[9] Zhengyou Zhang and Ying Shan, "A progressive scheme for stereo matching," in European Workshop on 3D Structure from Multiple Images of Large-Scale Environments. Springer, 2000, pp. 68-85.

[10] Heiko Hirschmüller, Peter R Innocent, and Jon Garibaldi, "Real-time correlation-based stereo vision with reduced border errors," International Journal of Computer Vision, vol. 47, no. 1-3, pp. 229-246, 2002.

[11] Paul Merrell, Amir Akbarzadeh, Liang Wang, Philippos Mordohai, Jan-Michael Frahm, Ruigang Yang, David Niste'r, and Marc Pollefeys, "Real-time visibility-based fusion of depth maps," in Computer Vision, 2007. ICCV 2007. IEEE 11th International Conference on. IEEE, 2007, pp. 1-8.

[12] Kuk-Jin Yoon and In So Kweon, "Distinctive similarity measure for stereo matching under point ambiguity," Computer Vision and Image Understanding, vol. 112, no. 2, pp. 173-183, 2008.

[13] Aristotle Spyropoulos and Philippos Mordohai, "Correctness Prediction, Accuracy Improvement and Generalization of Stereo Matching Using Supervised Learn-ing," International Journal of Computer Vision, vol. 118, no. 3, pp. 300-318, 2016.

[14] Aristotle Spyropoulos, Nikos Komodakis, and Philippos Mordohai, "Learning to detect ground control points for improving the accuracy of stereo matching," in Computer Vision and Pattern Recognition (CVPR), 2014 IEEE Conference on. IEEE, 2014, pp. 1621-1628.

[15] Min-Gyu Park and Kuk-Jin Yoon, "Leveraging stereo matching with learning-based confidence measures," in Proceedings of the IEEE Conference on Computer Vision and Pattern Recognition, 2015, pp. 101-109.

[16] Matteo Poggi and Stefano Mattoccia, "Learning a general-purpose confidence measure based on o (1) features and a smarter aggregation strategy for semi global matching," in 3D Vision (3DV), 2016 Fourth International Conference on. IEEE, 2016, pp. 509-518.

[17] Xiaoyan Hu and Philippos Mordohai, "A quantitative evaluation of confidence measures for stereo vision," IEEE Transactions on Pattern Analysis and Machine Intelligence, vol. 34, no. 11, pp. 2121-2133, 2012.

[18] Matteo Poggi and Stefano Mattoccia, "Learning from scratch a confidence measure," Proceedings of the British Machine Vision Conference 2016, no. Cv, pp. 46.1-46.13, 2016.

[19] Ralf Haeusler, Rahul Nair, and Daniel Kondermann, "Ensemble learning for confidence measures in stereo vision," in Computer Vision and Pattern Recognition (CVPR), 2013 IEEE Conference on. IEEE, 2013, pp. 305-312.

[20] Matteo Poggi, Fabio Tosi, and Stefano Mattoccia, "Quantitative Evaluation of Confidence Measures in a Machine Learning World," 2017 IEEE International Conference on Computer Vision (ICCV), vol. 2012, pp. 5238-5247, 2017.

[21] Ke Zhang, Jiangbo Lu, and Gauthier Lafruit, "Cross-based local stereo matching using orthogonal integral images," IEEE transactions on circuits and systems for video technology, vol. 19, no. 7, pp. 1073-1079, 2009.

[22] Andreas Geiger, Philip Lenz, and Raquel Urtasun, "Are we ready for autonomous driving? the kitti vision benchmark suite," in Conference on Computer Vision and Pattern Recognition (CVPR), 2012.

[23] Daniel Scharstein and Richard Szeliski, "High-accuracy stereo depth maps using structured light," in Computer Vision and Pattern Recognition, 2003. Proceedings. 2003 IEEE Computer Society Conference on. IEEE, 2003, vol. 1, pp. I-I.

[24] Daniel Scharstein and Chris Pal, "Learning conditional random fields for stereo," in Computer Vision and Pattern Recognition, 2007. CVPR'07. IEEE Conference on. IEEE, 2007, pp. 1-8.
[25] Heiko Hirschmuller and Daniel Scharstein, "Evaluation of cost functions for stereo matching," in Computer Vision and Pattern Recognition, 2007. CVPR'07. IEEE Conference on. IEEE, 2007, pp. 1-8.
[26] Minglun Gong and Yee-Hong Yang, "Fast unambiguous stereo matching using reliability-based dynamic programming," IEEE Transactions on Pattern Analysis and Machine Intelligence, vol. 27, no. 6, pp. 998-1003, 2005.
[27] Xing Mei, Xun Sun, Mingcai Zhou, Shaohui Jiao, Haitao Wang, and Xiaopeng Zhang, "On building an accurate stereo matching system on graphics hardware," 2011, pp. 467-474.

The invention claimed is:

1. An apparatus for determining a confidence measure measuring a confidence in a correctness of, or an uncertainty measure measuring a liability of incorrectness of, a measurement of a disparity of a predetermined position of a first picture relative to a second picture, wherein the apparatus comprises an electronic circuit or microprocessor wherein the apparatus comprises an electronic circuit or microprocessor configured to, or a computer programmed to, configured to, or a computer programmed to,
  accumulate, for each of a set of disparity candidates for the predetermined position, a contribution value which depends on the respective disparity candidate and a dissimilarity to the second picture which is associated with the respective disparity candidate according to a function which
    comprises a first monotonicity with the dissimilarity associated with the respective disparity candidate, and
    comprises a second monotonicity, opposite to the first monotonicity, with an absolute difference between the respective disparity candidate and a predetermined disparity having a minimum dissimilarity associated therewith among dissimilarities associated with the set of disparity candidates, and
  compute the contribution value as a product comprising a first factor and a second factor, the first factor comprises the first monotonicity with the dissimilarity associated with the respective disparity candidate, and the second factor comprises the second monotonicity with the absolute difference between the respective disparity candidate and the predetermined disparity.

2. The apparatus according to claim 1, wherein the first factor depends on the dissimilarity associated with the respective disparity candidate according to a first monotonic function comprising a plateau for dissimilarity values corresponding to lower dissimilarities than a first predetermined threshold.

3. The apparatus according to claim 2, wherein the apparatus is configured to determine the first predetermined threshold depending on a maximum dissimilarity among the dissimilarities associated with the set of disparity candidates.

4. The apparatus according to claim 2, wherein the apparatus is configured to determine the first predetermined threshold based on the minimum dissimilarity and the maximum dissimilarity.

5. The apparatus according to claim 2, wherein the apparatus is configured to determine the first predetermined threshold based on a sum of the minimum dissimilarity and a predetermined fraction of the maximum dissimilarity, the predetermined fraction being smaller than one.

6. The apparatus according to claim 2, wherein the apparatus is configured to determine the first predetermined threshold based on a predetermined fraction of the minimum dissimilarity or a difference of the minimum dissimilarity and a predetermined fraction of a difference between the minimum dissimilarity and the maximum dissimilarity with the predetermined fraction being smaller than one.

7. The apparatus according to claim 2, wherein the first monotonic function is strictly monotonic corresponding to dissimilarities larger than the first predetermined threshold.

8. The apparatus according to claim 2, wherein the first monotonic function is $$1/(c(d)-\text{const})$$

above the first predetermined threshold with c(d) being the dissimilarity associated with the disparity candidate d and const being a constant.

9. The apparatus according to claim 1, wherein the second factor depends on the absolute difference according to a predetermined function according to which the absolute difference is subject to a power greater than 1 below a second predetermined threshold and comprises a plateau above the second predetermined threshold.

10. The apparatus according to claim 9, wherein the second predetermined threshold depends on a range of the set of disparity candidates.

11. The apparatus according to claim 1, wherein the dissimilarity measure is a sum of squared sample differences, or the similarity measure is a correlation value.

12. An apparatus for determining a confidence measure measuring a confidence in a correctness of, or an uncertainty measure measuring a liability of incorrectness of, a measurement of a disparity of a predetermined position of a first picture relative to a second picture, wherein the apparatus comprises an electronic circuit or microprocessor configured to, or a computer programmed to,
  accumulate, for each of a set of disparity candidates for the predetermined position, a contribution value which depends on the respective disparity candidate and a dissimilarity to the second picture which is associated with the respective disparity candidate according to a function which
    comprises a first monotonicity with the dissimilarity associated with the respective disparity candidate, and
    comprises a second monotonicity, opposite to the first monotonicity, with an absolute difference between the respective disparity candidate and a predetermined disparity having a minimum dissimilarity associated therewith among dissimilarities associated with the set of disparity candidates,
  wherein the first monotonicity is a monotonic increase and the second monotonicity is a monotonic decrease and the apparatus is configured to subject a result of the accumulation to a monotonically decreasing function to acquire the confidence measure, or use the result of the accumulation as the uncertainty measure, or
  wherein the first monotonicity is a monotonic decrease and the second monotonicity is a monotonic increase and the apparatus is configured to subject a result of the accumulation to a monotonically decreasing function to acquire the uncertainty measure, or use the result of the accumulation as the confidence measure.

13. The apparatus according to claim 12, wherein the monotonically decreasing function maps x onto 1/x.

14. An apparatus for determining a confidence measure measuring a confidence in a correctness of, or an uncertainty measure measuring a liability of incorrectness of, a measurement of a disparity of a predetermined position of a first picture relative to a second picture, wherein the apparatus comprises an electronic circuit or microprocessor configured to, or a computer programmed to, calculate the confidence measure by accumulating, for each of a set of disparity candidates for the predetermined position, a contribution value which depends on the respective disparity candidate and a dissimilarity to the second picture which is associated with the respective disparity candidate, so that the confidence measure C(x,y) is $$C(x, y) = \frac{1}{\sum_{d=d_{min}}^{d_{max}} \frac{\max(\min(\Delta d(x, y, d) - 1, \frac{D}{3}), 0)^2}{\max(\Delta c(x, y, d) - \frac{c_{max}(x, y)}{5}, 1)}},$$

where
(x,y) is the predetermined position, d denotes a disparity candidate, $$\frac{\max(\min(\Delta d(x, y, d) - 1, \frac{D}{3}), 0)^2}{\max(\Delta c(x, y, d) - \frac{c_{max}(x, y)}{5}, 1)}$$

is the contribution value for the disparity candidate d, $d_{min}$ and $d_{max}$ are a lower and upper bounds of an interval within which the set of disparity candidates are spread, $$D = d_{max} - d_{min},$$

$c_{max}$ is a maximum dissimilarity among the dissimilarities associated with the set of disparity candidates,
$\Delta c(x,y,d) = c(d(x,y)) - c_1(x,y)$ with c(d) being the dissimilarity associated with the disparity candidate d, and $c_1$ being the minimum dissimilarity,
$\Delta d = |d - d_1|$ with $d_1$ being the predetermined disparity having the minimum dissimilarity associated therewith among dissimilarities associated with the set of disparity candidates.

15. A system for generating a depth/disparity map for first picture relative to a second picture, comprising
a determinator for determining a disparity of a predetermined position of the first picture relative to the second picture, and
an apparatus for determining a confidence measure measuring a confidence in the correctness of, or an uncertainty measure measuring a liability of incorrectness of, a measurement of the disparity of the predetermined position of the first picture relative to the second picture by accumulating, for each of a set of disparity candidates for the predetermined position, a contribution value which depends on the respective disparity candidate and a dissimilarity to the second picture which is associated with the respective disparity candidate according to a function which comprises a first monotonicity with the dissimilarity associated with the respective disparity candidate, and
comprises a second monotonicity, opposite to the first monotonicity, with an absolute difference between the respective disparity candidate and a predetermined disparity having a minimum dissimilarity associated therewith among dissimilarities associated with the set of disparity candidates,
wherein the determinator is configured to determine the predetermined disparity having a minimum dissimilarity associated therewith among the dissimilarities associated with the set of disparity candidates as the disparity and
wherein at least one of the determinator and the apparatus is implemented by an electronic circuit or microprocessor, or programmed computer.

16. The system according to claim 15, wherein
the determinator is configured to perform the determination by disregarding the disparity determined and substitute the disparity determined by way of a substitute disparity, in case of the confidence measure being too low, or the uncertainty measure too high.

17. The system according to claim 16, wherein the determinator is configured to
derive the substitute disparity using spatial prediction or adopting a disparity stemming from a different depth/disparity map of a different view.

18. A system for performing view synthesis based on a first picture, comprising
a system for generating a depth/disparity map for the first picture relative to a second picture according to claim 15, and
view synthesizer configured to perform the view synthesis using the depth/disparity map,
wherein the view synthesizer is configured to perform the view synthesis based on the depth/disparity map and the confidence measure or the uncertainty measure, or
wherein the view synthesizer is configured to perform the view synthesis based on the depth/disparity map and the confidence measure or the uncertainty measure by controlling an amount at which the view synthesis relies on the disparity measured or the related color value depending on the confidence measure or the uncertainty measure.

19. A method for determining a confidence measure measuring a confidence in a correctness of, or an uncertainty measure measuring a liability of incorrectness of, a measurement of a disparity of a predetermined position of a first picture relative to a second picture, comprising
accumulating, for each of a set of disparity candidates for the predetermined position, a contribution value which depends on the respective disparity candidate and a dissimilarity to the second picture which is associated with the respective disparity candidate according to a function which
comprises a first monotonicity with the dissimilarity associated with the respective disparity candidate, and
comprises a second monotonicity, opposite to the first monotonicity, with an absolute difference between the respective disparity candidate and a predetermined disparity having a minimum dissimilarity associated therewith among dissimilarities associated with the set of disparity candidates, and
computing the contribution value as a product comprising a first factor and a second factor, the first factor comprises the first monotonicity with the dissimilarity associated with the respective disparity candidate, and the second factor comprises the second monotonicity with the absolute difference between the respective disparity candidate and the predetermined disparity.

20. A non-transitory digital storage medium having a computer program stored thereon to perform the method of claim 19, when said computer program is run by a computer.

21. A method for determining a confidence measure measuring a confidence in a correctness of, or an uncertainty measure measuring a liability of incorrectness of, a measurement of a disparity of a predetermined position of a first picture relative to a second picture, comprising accumulating, for each of a set of disparity candidates for the predetermined position, a contribution value which depends on the respective disparity candidate and a dissimilarity to the second picture which is associated with the respective disparity candidate according to a function which comprises a first monotonicity with the dissimilarity associated with the respective disparity candidate, and comprises a second monotonicity, opposite to the first monotonicity, with an absolute difference between the respective disparity candidate and a predetermined disparity having a minimum dissimilarity associated therewith among dissimilarities associated with the set of disparity candidates, wherein the first monotonicity is a monotonic increase and the second monotonicity is a monotonic decrease and a result of the accumulation is subject to a monotonically decreasing function to acquire the confidence measure, or the result of the accumulation is used as the uncertainty measure, or wherein the first monotonicity is a monotonic decrease and the second monotonicity is a monotonic increase and a result of the accumulation is subject to a monotonically decreasing function to acquire the uncertainty measure, or the result of the accumulation is used as the confidence measure.

22. A method for determining a confidence measure measuring a confidence in a correctness of, or an uncertainty measure measuring a liability of incorrectness of, a measurement of a disparity of a predetermined position of a first picture relative to a second picture, comprising calculating the confidence measure by accumulating, for each of a set of disparity candidates for the predetermined position, a contribution value which depends on the respective disparity candidate and a dissimilarity to the second picture which is associated with the respective disparity candidate, and so that the confidence measure $C(x,y)$ is $$C(x, y) = \frac{1}{\displaystyle\sum_{d=d_{min}}^{d_{max}} \frac{\max\left(\min\left(\Delta d(x, y, d) - 1, \frac{D}{3}\right), 0\right)^2}{\max\left(\Delta c(x, y, d) - \frac{c_{max}(x, y)}{5}, 1\right)}},$$

where (x,y) is the predetermined position, d denotes a disparity candidate, $$\frac{\max\left(\min\left(\Delta d(x, y, d) - 1, \frac{D}{3}\right), 0\right)^2}{\max\left(\Delta c(x, y, d) - \frac{c_{max}(x, y)}{5}, 1\right)}$$

is the contribution value for the disparity candidate d, $d_{min}$ and $d_{max}$ are a lower and upper bounds of an interval within which the set of disparity candidates are spread, $D = d_{max} - d_{min}$, $c_{max}$ is a maximum dissimilarity among the dissimilarities associated with the set of disparity candidates, $\Delta c(x,y,d) = c(d(x,y)) - c_1(x,y)$ with c(d) being the dissimilarity associated with the disparity candidate d, and $c_1$ being the minimum dissimilarity, $\Delta d = |d - d_1|$ with $d_1$ being a predetermined disparity having a minimum dissimilarity associated therewith among dissimilarities associated with the set of disparity candidates.

* * * * *

UNITED STATES PATENT AND TRADEMARK OFFICE
CERTIFICATE OF CORRECTION

PATENT NO. : 10,949,989 B2
APPLICATION NO. : 16/270601
DATED : March 16, 2021
INVENTOR(S) : Ronald Op Het Veld et al.

It is certified that error appears in the above-identified patent and that said Letters Patent is hereby corrected as shown below:

In the Claims

Claim 22, Column 24, Line 37:
"□c(x,y,d) = c(d(x,y)) – c1 (x,y) with c(d) being the dissimilarity..."
Should read:
--$\Delta$c(x,y,d) = c(d(x,y)) – c1 (x,y) with c(d) being the dissimilarity...--

Claim 22, Column 24, Line 40:
"□d = |d - d1| with d1 being a predetermined disparity having a minimum dissimilarity..."
Should read:
--$\Delta$d= |d - d1| with d1 being a predetermined disparity having a minimum dissimilarity...--

Signed and Sealed this
Fifth Day of July, 2022

Katherine Kelly Vidal
*Director of the United States Patent and Trademark Office*